(12) United States Patent
Miura et al.

(10) Patent No.: US 7,264,764 B2
(45) Date of Patent: Sep. 4, 2007

(54) METHOD OF MANUFACTURING BRANCHING PIPE

(75) Inventors: Natsushi Miura, Aichi-ken (JP); Zenichi Yasuda, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 501 days.

(21) Appl. No.: 10/852,696

(22) Filed: May 25, 2004

(65) Prior Publication Data

US 2004/0239010 A1    Dec. 2, 2004

(30) Foreign Application Priority Data

May 27, 2003    (JP)    ............................. 2003-149353

(51) Int. Cl.
*B29C 57/08*    (2006.01)
(52) U.S. Cl. ...................... 264/563; 264/565; 264/566; 264/150
(58) Field of Classification Search ...................... None
See application file for complete search history.

(56) References Cited

U.S. PATENT DOCUMENTS

| | | | | |
|---|---|---|---|---|
| 3,996,323 | A * | 12/1976 | Hegler et al. | ................ 264/508 |
| 4,510,013 | A * | 4/1985 | Lupke et al. | ................ 156/498 |
| 4,770,618 | A * | 9/1988 | Lupke | ........................ 425/72.1 |
| 4,846,660 | A * | 7/1989 | Drossbach | ................... 425/503 |
| 4,865,797 | A * | 9/1989 | Jarvenkyla | ................... 264/508 |
| 5,049,224 | A * | 9/1991 | Umezawa et al. | .......... 156/294 |
| 5,104,468 | A * | 4/1992 | de Jong | ....................... 156/166 |
| 6,311,730 | B2 * | 11/2001 | Penza | ........................... 138/98 |
| 6,372,168 | B1 * | 4/2002 | Jarvenkyla | ................... 264/167 |
| 6,394,142 | B1 * | 5/2002 | Woelfel et al. | ............. 138/115 |
| 6,844,037 | B2 * | 1/2005 | Gombert et al. | ........... 428/35.7 |
| 6,873,048 | B2 * | 3/2005 | Gao et al. | .................... 257/750 |
| 2003/0152792 | A1 * | 8/2003 | Takayasu et al. | ........... 428/515 |

FOREIGN PATENT DOCUMENTS

| | | |
|---|---|---|
| JP | 05-024101 | 2/1993 |
| JP | 07-214645 | 8/1995 |
| JP | 2001-097054 | 4/2001 |

* cited by examiner

*Primary Examiner*—Christina Johnson
*Assistant Examiner*—Keith J. Godfrey
(74) *Attorney, Agent, or Firm*—Posz Law Group, PLC

(57) ABSTRACT

The manufacturing method of the invention manufactures a fuel filler pipe (branching pipe), where a breather pipe is branched off from a filler pipe main body. The manufacturing method extrudes a first extruded tubular member and a second extruded tubular member, conveys molds arranged on both sides of the first extruded tubular member and the second extruded tubular member, and forms the first extruded tubular member and the second extruded tubular member corresponding to molding surfaces of the molds, so as to mold the filler pipe main body and the breather pipe. The manufacturing method then thermally welds part of the second extruded tubular member with an outer wall of the first extruded tubular member and closes an opening end of the breather pipe to form a welding joint portion. A connection hole for connecting the conduit of the filler pipe main body with the conduit of the breather pipe is formed in the welding joint portion with a tool inserted through an opening of the filler pipe main body. This manufacturing method has excellent productivity and desirably reduces the manufacturing cost.

4 Claims, 8 Drawing Sheets

METHOD OF MANUFACTURING BRANCHING PIPE

This application claims the benefit of and priority from Japanese Application No. 2003-149353 filed May 27, 2003, the content of which is incorporated herein by reference.

BACKGROUND OF THE INVENTION

1. Field of the Invention

The present invention relates to a method of manufacturing a branching pipe, which is used for a fuel filler pipe of automobiles or a water pipe and has a sub pipe branched off from a main pipe.

2. Description of the Related Art

A known branching pipe is a fuel filler pipe for automobiles as disclosed in JP No. 2001-96054A. The fuel filler pipe has a filler pipe main body, which connects a filler neck with a fuel tank and has a branching portion. A breather pipe is connected with the branching portion by press fitting or thermal welding. This prior art technique, however, increases the number of parts and requires assembly of the respective parts, thus undesirably increasing the manufacturing cost.

Another known technique of linking two pipes simultaneously forms a first pipe and a second pipe by blowing as disclosed in JP No. 7-214645A and No. 5-24101A. The blowing method, however, has difficulties in forming a complicated curved shape and is not suitable for continuous molding. This undesirably lowers the productivity and increases the manufacturing cost.

SUMMARY OF THE INVENTION

The object of the invention is thus to provide a manufacturing method of a branching pipe that has excellent productivity and effectively reduces the manufacturing cost.

In order to attain at least part of the above and the other related objects, the present invention is directed to a method of manufacturing a branching pipe, where a second pipe is branched off from a first pipe. The manufacturing method includes: an extrusion step of extruding a first extruded tubular member and a second extruded tubular member, which is substantially parallel to the first extruded tubular member; a first forming step of conveying molds arranged on both sides of the first extruded tubular member and the second extruded tubular member and forming the first extruded tubular member and the second extruded tubular member corresponding to molding surfaces of the molds, so as to mold the first pipe and the second pipe; a second forming step of thermally welding part of the second extruded tubular member with an outer wall of the first extruded tubular member and closing the second extruded tubular member to form a welding joint portion; and a hole formation step of forming a connection hole for connecting a conduit of the first pipe with a conduit of the second pipe in the welding joint portion.

The manufacturing method of the invention extrudes the first extruded tubular member and the second extruded tubular member substantially parallel to the first extruded tubular member, conveys molds arranged on both sides of the first extruded tubular member and the second extruded tubular member, and forms the first extruded tubular member and the second extruded tubular member corresponding to molding surfaces of the molds, so as to mold the first pipe and the second pipe. The manufacturing method then thermally welds part of the second extruded tubular member with the outer wall of the first extruded tubular member and closes the second extruded tubular member to form the welding joint portion. The manufacturing method subsequently forms the connection hole for connecting the conduit of the first pipe with the conduit of the second pipe in the welding joint portion. This manufacturing method gives the branching pipe where the second pipe is branched off from the first pipe.

The manufacturing method of the invention readily molds the branching pipe of a complicated curved shape through the above continuous process by varying the shapes of the molding surfaces of the multiple molds. This manufacturing method increases the number of molding cycles and heightens the productivity, compared with the three-dimensional blowing method discussed as the prior art.

The connection hole for connecting the first pipe with the second pipe is formed in the welding joint portion. The welding joint portion is formed in the second forming step, simultaneously with formation of the outer shapes of the first pipe and the second pipe corresponding to the molding surfaces of the molds. This ensures the excellent productivity. The welding joint portion is formed by closing and thermally welding part of the second pipe with the outer wall of the first pipe. Formation of the connection hole thus does not damage the sealing properties between the first pipe and the second pipe.

The connection hole is formed with a tool inserted through an opening of the first pipe. This facilitates the hole formation step.

In a preferable embodiment, the first forming step has a step of blowing a compressed gas into the first extruded tubular member and the second extruded tubular member, and the second forming step has a step of temporarily stopping the blow of the compressed gas into the second extruded tubular member, so as to form the welding joint portion. This arrangement facilitates formation of the outer shapes of the first pipe and the second pipe and formation of the welding joint portion.

One preferable application of the branching pipe is a fuel filler pipe of a fuel tank for an automobile. Here the first pipe is a filler pipe main body to feed a supply of fuel to the fuel tank, and the second pipe is a breather pipe to release the inner pressure of the fuel tank in the process of fuel supply. In this application, each of the first and the second pipes has multiple resin layers including a barrier layer having good fuel permeation resistance.

In another preferable embodiment, the second forming step has a step of making the closed portion of the second extruded tubular member form part of the outer wall of the first extruded tubular member.

Another application of the invention is a fuel filler pipe, which includes a filler pipe main body to form a conduit from a filler neck to a fuel tank and a breather pipe that is closed on one end to be welded to an upper wall surface of the filler pipe main body at a welding joint portion and is connected on the other end with a gas breathing nozzle formed on an upper face of the fuel tank. The welding joint portion has a connection hole for connecting the filler pipe main body with the breather pipe.

Still another application of the invention is a branching pipe manufacturing device used to manufacture a branching pipe where a second pipe is branched off from a first pipe. The branching pipe manufacturing device includes: a tubular body extrusion unit that has a first extrusion unit for extruding a first extruded tubular member and a second extrusion unit for extruding a second extruded tubular member substantially parallel to the first extruded tubular member; a molding unit that includes multiple molds, which respectively have cavities defined by molding surfaces for forming outer shapes of the first pipe and the second pipe, are split molds parted along a center axis of the cavities and arranged on both sides of a conveyor path in a loop, and form a welding joint portion by sealing an opening end of the second extruded tubular member onto an outer wall of the first extruded tubular member; a forming mechanism that includes a blow unit to blow a compressed gas into the first extruded tubular member and the second extruded tubular member and/or a suction unit to suck the molding surfaces in a negative pressure, so as to shape the first extruded tubular member and the second extruded tubular member according to the molding surfaces; and a conveyor unit that conveys the multiple split molds in a loop.

These and other objects, features, aspects, and advantages of the present invention will become more apparent from the following detailed description of the preferred embodiment with the accompanying drawings.

DESCRIPTION OF THE PREFERRED EMBODIMENTS (1) Structure of Fuel Filler Pipe 10

Figure 1:
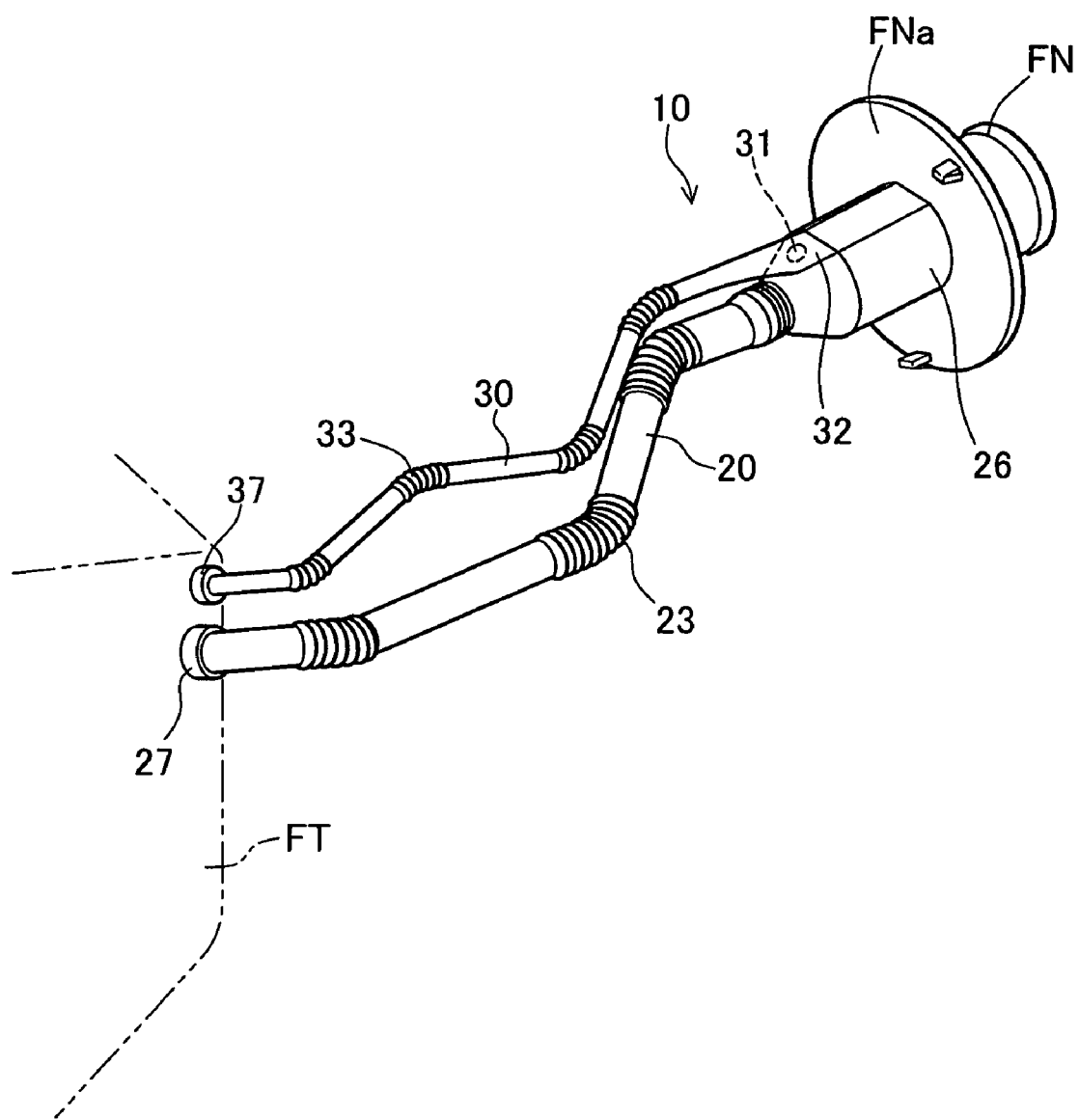
FIG. 1 is a perspective view showing connection of a fuel filler pipe as a branching pipe in one embodiment of the invention to a fuel tank.

FIG. 1 is a perspective view showing connection of a fuel filler pipe 10 as a branching pipe in one embodiment of the invention to a fuel tank FT.

Figure 2:
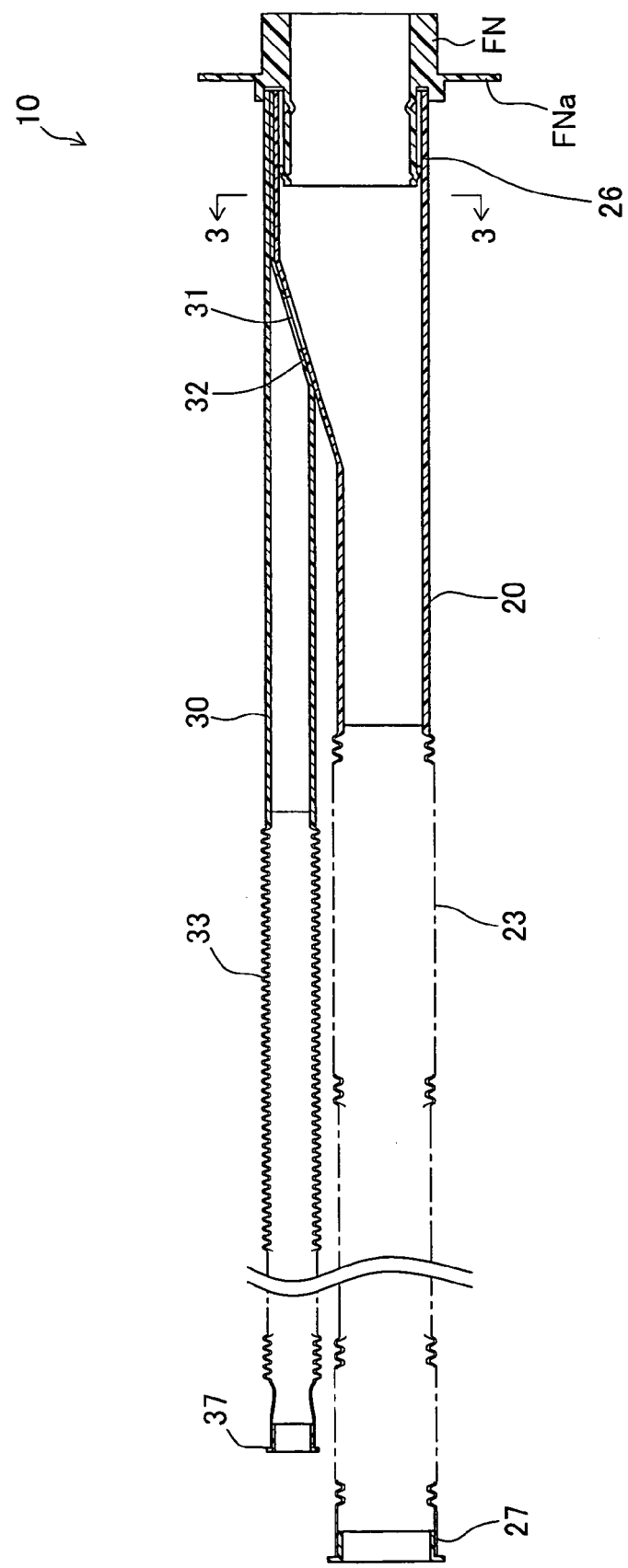
FIG. 2 is a sectional view showing the fuel filler pipe, prior to connection to the fuel tank.
Figure 3:
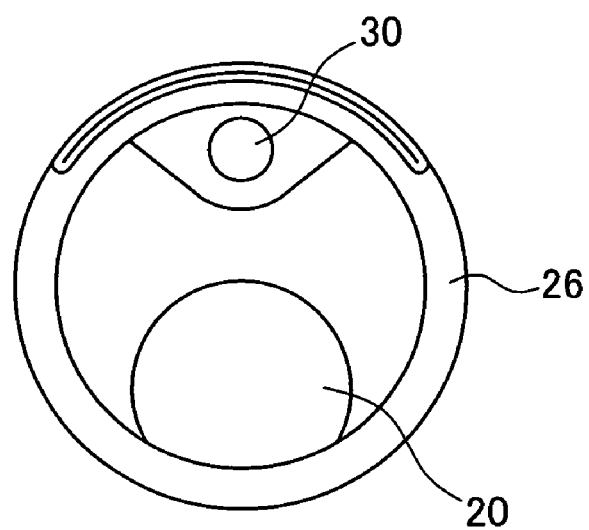
FIG. 3 is a sectional view showing the fuel filler pipe, taken on the line 3-3 in FIG. 2.

FIG. 2 is a sectional view showing the fuel filler pipe 10, prior to connection to the fuel tank FT. FIG. 3 is a sectional view showing the fuel filler pipe 10, taken on the line 3-3 in FIG. 2. The fuel filler pipe 10 is used for fuel supply to the fuel tank FT of an automobile, and includes a filler pipe main body 20 connecting with a filler neck FN and a breather pipe 30 branched off from the filler pipe main body 20. The filler pipe main body 20 forms a conduit from the filler neck FN to the fuel tank FT. One end of the filler pipe main body 20 on the side of the filler neck FN has a joint element 26 for attachment of a fuel cap (not shown). A flange FNa is formed on the outer wall of the filler neck FN. Joint of the flange FNa with an inlet box (not shown) attaches the fuel filler pipe 10 to a vehicle body member. A rubber sealing member 27 is set on the other end of the filler pipe main body 20 on the side of the fuel tank FT. Clamping the sealing member 27 with a metal band causes the filler pipe main body 20 to be linked with the fuel tank FT in a sealing manner. The filler pipe main body 20 has bellows-like structures 23 for facilitating layout of the bent conduit from the filler neck FN to the fuel tank FT.

The breather pipe 30 functions to release the inner pressure of the fuel tank FT in the process of fuel supply. A rubber sealing member 37 is attached to an end of the breather pipe 30 and seals between the end of the breather pipe 30 and the fuel tank FT in the same manner as the filler pipe main body 20. The breather pipe 30 also has bellows-like structures 33 for facilitating layout, like the filler pipe main body 20. The breather pipe 30 is welded to the filler pipe main body 20 at a welding joint portion 32, which is formed on a side wall in the vicinity of the joint element 26 of the filler pipe main body 20. The welding joint portion 32 has a connection hole 31, via which the breather pipe 30 is connected to the filler pipe main body 20.

Figure 4:
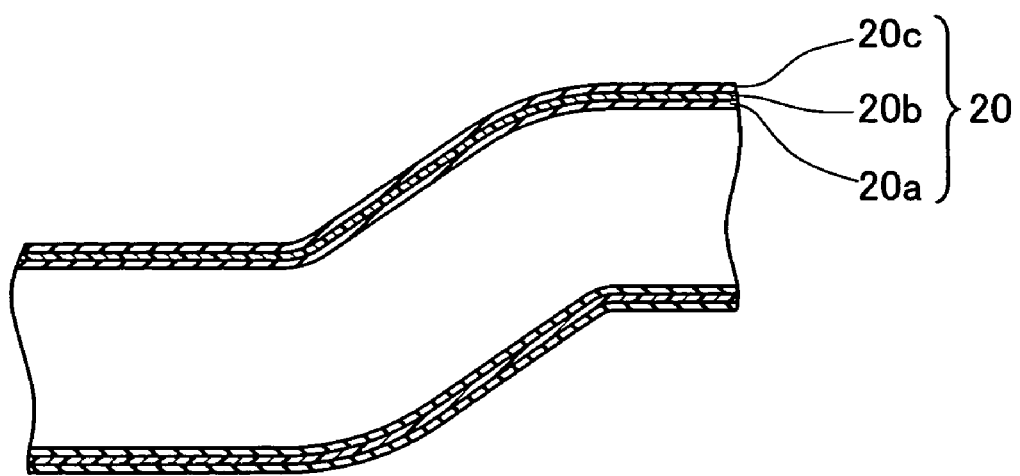
FIG. 4 is a sectional view showing the main part of a filler pipe main body in the fuel filler pipe.

The filler pipe main body 20 and the breather pipe 30 have a three-layer structure including an inner barrier layer that is composed of a resin material having an excellent fuel permeation resistance. FIG. 4 is a sectional view showing the main part of the filler pipe main body 20. The filler pipe main body 20 has an inner layer 20a composed of modified polyethylene (m-PE), a barrier layer 20b composed of ethylene vinyl alcohol copolymer (EVOH), and an outer layer 20c composed of modified polyethylene (m-PE). The filler pipe main body 20 is manufactured by a corrugating method, which simultaneously extruding the resins for the above three layers and forms the extruded resins into a pipe shape, as discussed later.

Resin materials for the filler pipe main body 20 and the breather pipe 30 are preferably those having excellent fuel permeation resistance. For example, high density polyethylene (HDPE), medium density polyethylene (MDPE), polyamide (PA), ethylene vinyl alcohol copolymer (EVOH), fluororesins (ETFE, PVDF), polyphenylene sulfide (PPS), polyethylene terephthalate (PET), polybutylene terephthalate (PBT), polyester elastomer, and polyether nitrile (PEN) may be selected appropriately in mono layer or in multi layers. Mutually welding resin materials are selected for the filler pipe main body 20 and the breather pipe 30, since the filler pipe main body 20 and the breather pipe 30 are welded to each other at the welding joint portion 32.

(2) Manufacturing Process of Fuel Filler Pipe 10

The manufacturing process of the fuel filler pipe 10 is described here. The fuel filler pipe 10 is manufactured with a pipe production unit 50 shown in FIG. 5.

(2)-1 Pipe Production Unit 50

Figure 5:
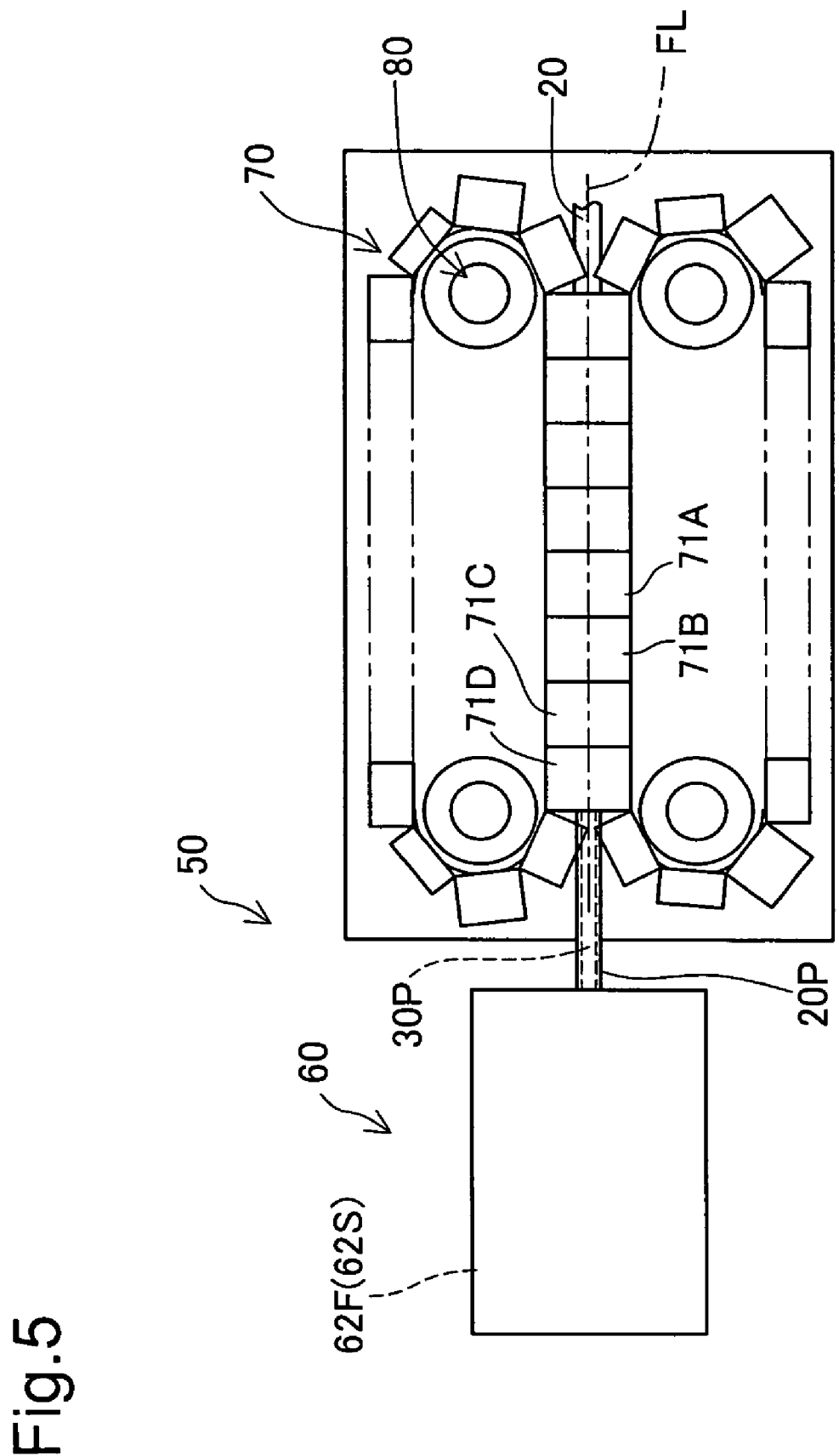
FIG. 5 schematically illustrates the structure of a pipe production unit.

FIG. 5 schematically illustrates the structure of the pipe production unit 50. The pipe production unit 50 includes a tubular body extrusion unit 60 for extruding a first extruded tubular member 20P and a second extruded tubular member 30P, a molding unit 70 for molding the outer circumferences of the first and the second extruded tubular members 20P and 30P extruded from the tubular body extrusion unit 60, and a conveyor unit 80 for conveying the molding unit 70 in a loop.

Figure 6:
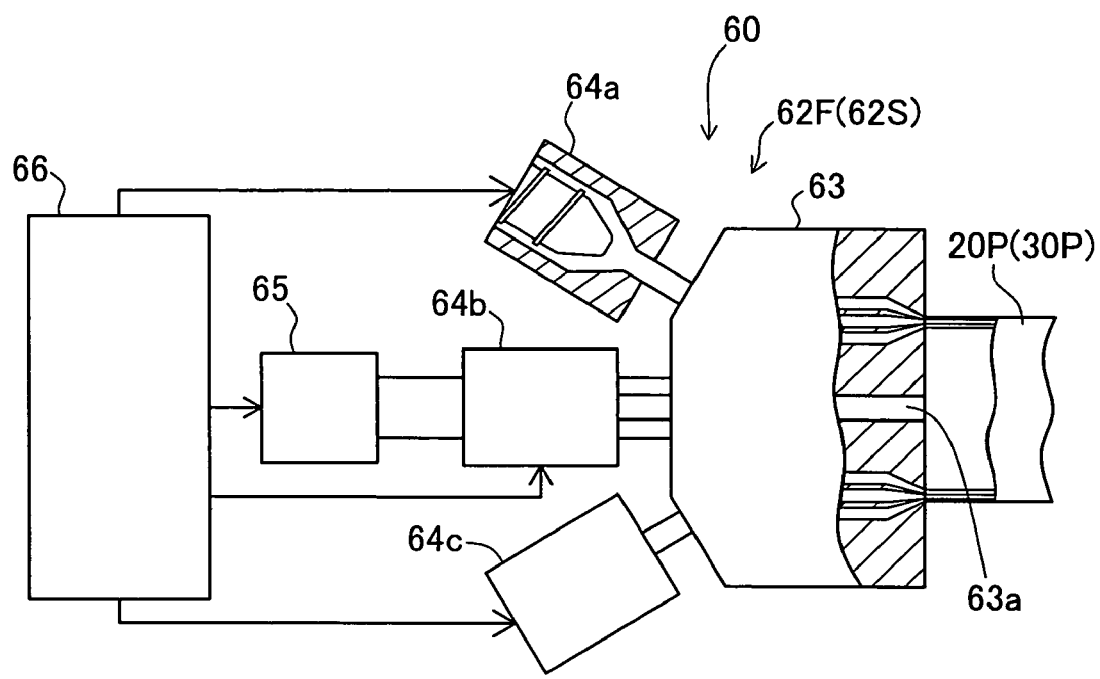
FIG. 6 shows a first extrusion unit in the pipe production unit.

The tubular body extrusion unit 60 has a first extrusion unit 62F for extruding the first extruded tubular member 20P to form the filler pipe main body 20 and a second extrusion unit 62S for extruding the second extruded tubular member 30P to form the breather pipe 30. The first and the second extrusion units 62F and 62S have substantially similar structures, although they extrude the tubular members of different diameters. Here the explanation regards the first extrusion unit 62F. FIG. 6 shows the first extrusion unit 62F. The first extraction unit 62F has a die 63 for extruding three layers of the first extruded tubular member 20P, resin supply mechanisms 64a, 64b, and 64c of screws and cylinders, a compressed gas supply source 65 for feeding a compressed gas into the first extruded tubular member 20P via a conduit 63a in the die 63, and a controller 66 for controlling the resin supply mechanisms 64a, 64b, and 64c and the compressed gas supply source 65. The first extrusion unit 62F is designed to extrude the respective resin materials, which are supplied from the resin supply mechanisms 64a, 64b, and 64c, through three pathways in the die 63 and thereby form three layers of the filler pipe main body 20.

Figure 7:
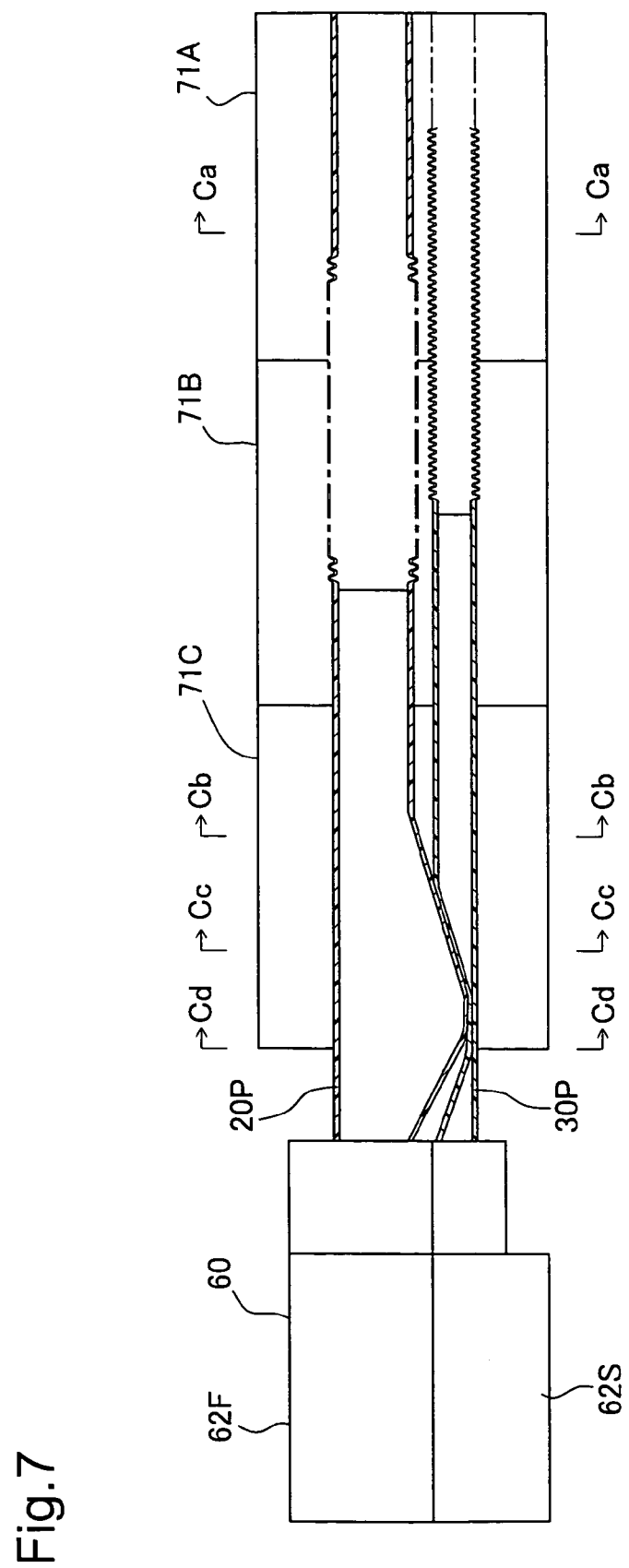
FIG. 7 is a sectional view showing part of a molding unit in the pipe production unit.

FIG. 7 is a sectional view showing part of the molding unit 70. The molding unit 70 has multiple molds 71 (71A, 71B, 71C . . . ), which respectively have molding surfaces corresponding to the respective parts of the filler pipe main body 20 and the breather pipe 30. These multiple molds 71 are arranged along a conveyance path FL, on which the first and the second extruded tubular members 20P and 30P are conveyed. Each of the multiple molds 71 is a split mold, which is parted along a center axis of the conveyed first and the second extruded tubular members 20P and 30P. These split molds are arranged in a loop to be clamped. The molding surface of each mold 71 has a suction opening to be connected with a suction pipe (not shown).

FIG. 8 is sectional views of the multiple molds 71. FIGS. 8(A), 8(B), 8(C), and 8(D) respective show cross sections taken on the lines Ca-Ca, Cb-Cb, Cc-Cc, and Cd-Cd. These cross sections have cavities on different molding surfaces. In FIG. 8(A), cavities 71Aa and 71Ab of the mold 71A are arranged apart from each other. This causes the filler pipe main body 20 and the breather pipe 30 to be formed as separate pipe of circular cross sections. In FIG. 8(B), cavities 71Ba and 71Bb of the mold 71C are arranged integrally. This joins the filler pipe main body 20 with the breather pipe 30 and causes the breather pipe 30 to be formed as a flat pipe. In FIG. 8(C), cavities 71Ca and 71Cb of the mold 71C are integrated, and the cavity 71Cb is crushed. This causes the breather pipe 30 have a flatter shape. In FIG. 8(D), cavities 71Da and 71Db of the mold 71C are integrated, and the cavity 71Db is further crushed and closed. This causes the breather pipe 30 to be crushed and form the welding joint portion 32.

(2)-2 Steps in Manufacturing Process

The following describes the respective steps in the manufacturing process of the fuel filler pipe 10 with the pipe production unit 50. With the blow of the compressed gas fed from the compressed gas supply source 65 through the conduit 63a in the die 63 as shown in FIG. 6, the first and the second extruded tubular members 20P and 30P are respectively extruded from the first and the second extrusion units 62F and 62S. The conveyor unit 80 (see FIG. 5) conveys and clamps the multiple molds 71 (71A, 71B, 71C, . . . ) to mold the first and the second extruded tubular members 20P and 30P and thereby form the filler pipe main body 20 and the breather pipe 30.

The multiple molds 71 are conveyed to be matched with the die 63 included in the tubular body extrusion unit 60. The first and the second extruded tubular members 20P and 30P extruded from the die 63 are kept and clamped in the respective cavities of the molds 71. The compressed gas is blown into the first and the second extruded tubular members 20P and 30P, while the multiple molds 71 are clamped and the molding surfaces of the molds 71 are sucked by the suction pipe. This gives the outer shapes of the first and the second extruded tubular members 20P and 30P. The thickness of each layer of the fuel filler pipe 10 is regulated by varying the extrusion speed and the take-off speed.

Figure 8A:
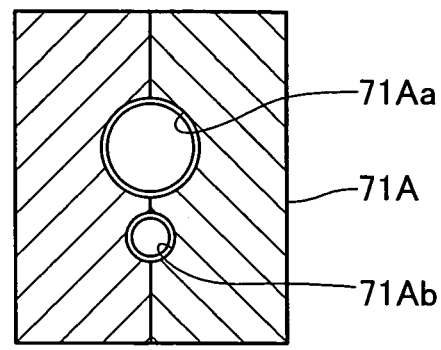
FIG. 8(A) is sectional views showing cavities of multiple molds, taken on the line Ca-Ca in FIG. 7.
Figure 8B:
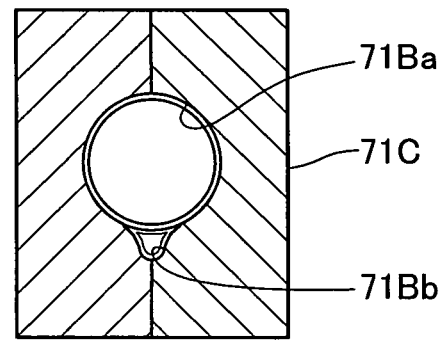
FIG. 8(B) is sectional views showing cavities of multiple molds, taken on the line Cb-Cb in FIG. 7.
Figure 8C:
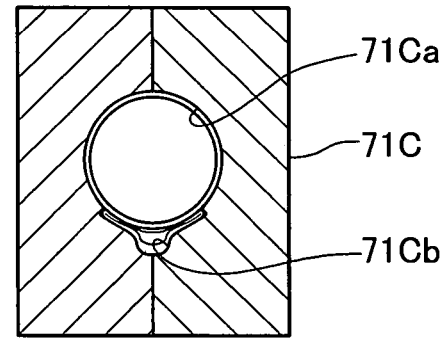
FIG. 8(C) is sectional views showing cavities of multiple molds, taken on the line Cc-Cc in FIG. 7.
Figure 8D:
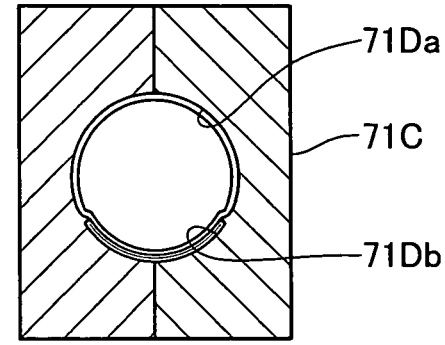
FIG. 8(D) is sectional views showing cavities of multiple molds, taken on the line Cd-Cd in FIG. 7.

In the mold 71A of FIG. 8(A), the cavities 71Aa and 71Ab are separate from each other to form the filler pipe main body 20 and the breather pipe 30 as separate pipes. With the conveyance to the mold 71B and the mold 71C shown in FIGS. 8(B) and 8(C), the cavities 71Ba and 71Bb(71Ca and 71Cb) are integrated, while the cavity 71Bb (71Cb) is gradually crushed. This makes the conduit of the breather pipe 30 flat. Since, in the mold 71C of FIG. 8(D), the cavity 71Db is crushed to the wall thickness of the breather pipe 30, the breather pipe 30 is completely flat and forms the welding joint portion 32, at which the breather pipe 30 is joined with the filler pipe main body 20. Namely the breather pipe 30 forms the welding joint portion 32, which is integrated with the wall of the filler pipe main body 20.

When the periphery of the cavity 71Db for forming the breather pipe 30 is close to the second extrusion unit 62S, the blow of the compressed gas in the second extrusion unit 62S is stopped. This crushes the second extruded tubular member 30P to readily form the welding joint portion 32. The other parts of the second extruded tubular member 30P are sucked by the suction pipe and are thus not crushed. The blow of the compressed gas in the second extrusion unit 62S is then resumed to form the filler pipe main body 20 and the breather pipe 30 as separate pipes in the reverse order of the steps (FIG. 8(D)→ FIG. 8(C)→ FIG. 8(B)→ FIG. 8(A)). The first and the second extruded tubular members 20P and 30P formed by repetition of this continuous process are cut off at preset positions.

Figure 9:
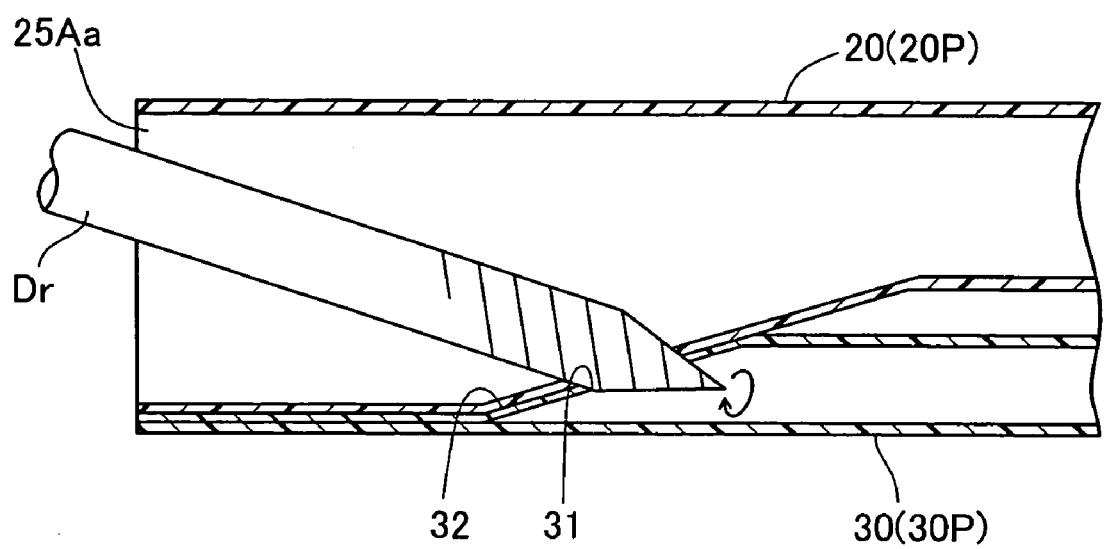
FIG. 9 shows a process of forming a hole.

As shown in FIG. 9, a tool like a drill Dr is inserted through an opening 25Aa of the filler pipe main body 20 to form the connection hole 31 in the welding joint portion 32. The filler pipe main body 20 and the breather pipe 30 are connected with each other via the connection hole 31. The filler neck FN and the sealing member 27 are then attached to the filler pipe main body 20 and the breather pipe 30 as shown in FIG. 1.

(3) Functions and Effects of Fuel Filler Pipe 10

The manufacturing method of the fuel filler pipe 10 has the following functions and effects, in addition to those discussed above.

(3)-1 The fuel filler pipe 10 of a complicated curved shape is readily molded through the above continuous process by varying the shapes of the molding surfaces of the multiple molds 71. This manufacturing method increases the number of molding cycles and heightens the productivity, compared with the three-dimensional blowing method discussed as the prior art.

(3)-2 Since the welding joint portion 32 has the connection hole 31 for connecting the filler pipe main body 20 with the breather pipe 30, and the welding joint portion 32 is produced by the step of forming the outer shape of the pipes according to the molding surfaces of the molds 71, this ensures the good productivity. As the welding joint portion 32 is formed by thermally welding the opening end of the breather pipe 30 to the outer wall of the filler pipe main body 20, formation of the connection hole 31 thus does not damage the sealing properties between the filler pipe main body 20 and the breather pipe 30.

(3)-3 The connection hole 31 is easily formed with a tool inserted through the opening 25Aa of the filler pipe main body 20.

(3)-4 Since the fuel filler pipe 10 has multiple resin layers including the barrier layer 20b and the joint of the filler pipe main body 20 with the breather pipe 30 is not cut off in a mold, the integral barrier layer 20b enhances the fuel permeation resistance.

(3)-5 Since the filler pipe main body 20 and the breather pipe 30 are integrally molded of the resins, no rubber hose is required for connection with the fuel tank FT. This simple connection structure reduces the manufacturing cost and significantly prevents the permeation of the fuel, which is observed in the structure with a rubber hose.

The embodiment discussed above is to be considered in all aspects as illustrative and not restrictive. There may be many modifications, changes, and alterations without departing from the scope or spirit of the main characteristics of the present invention.

The embodiment discussed above regards the fuel filler pipe. The technique of the invention is not restricted to the fuel filler pipe but is also applicable to, for example, a water pipe in a cooling system of an engine.

All changes within the meaning and range of equivalency of the claims are intended to be embraced therein. The scope and spirit of the present invention are indicated by the appended claims, rather than by the foregoing description.

What is claimed is:

1. A method of manufacturing a branching pipe having a first pipe and a second pipe, the second pipe being branched off from the first pipe, the manufacturing method comprising:
   an extrusion step of extruding a first extruded tubular member and a second extruded tubular member, the second extruded tubular member being substantially parallel to the first extruded tubular member;
   a first forming step of conveying molds arranged on both sides of the first extruded tubular member and the second extruded tubular member and forming the first extruded tubular member and the second extruded tubular member corresponding to molding surfaces of the molds, so as to mold the first pipe and the second pipe;
   a second forming step of thermally welding part of the second extruded tubular member with an outer wall of the first extruded tubular member and closing parts of the second extruded tubular member to form a welding joint portion;
   a hole formation step of forming a connection hole for connecting a conduit of the first pipe with a conduit of the second pipe in the welding joint portion; wherein
   the first forming step has a step of blowing a compressed gas into the first extruded tubular member and the second extruded tubular member; and
   the second forming step has a step of stopping the blow of the compressed gas into the second extruded tubular member, while blowing the compressed gas into the first extruded tubular member to expand the first extruded tubular member, so as to form the welding joint portion.

2. The manufacturing method in accordance with claim 1, wherein the second forming step has a step of stopping the blow of the compressed gas into the second extruded tubular member, so as to form the welding joint portion.

3. A method of manufacturing a branching pipe having a first pipe and a second pipe, the second pipe being branched off from the first pipe, the manufacturing method comprising:
   an extrusion step of extruding a first extruded tubular member and a second extruded tubular member, the second extruded tubular member being substantially parallel to the first extruded tubular member;
   a first forming step of conveying molds arranged on both sides of the first extruded tubular member and the second extruded tubular member and forming the first extruded tubular member and the second extruded tubular member corresponding to molding surfaces of the molds, so as to mold the first pipe and the second pipe;
   a second forming step of thermally welding part of the second extruded tubular member with an outer wall of the first extruded tubular member and closing parts of the second extruded tubular member to form a welding joint portion;
   a hole formation step of forming a connection hole for connecting a conduit of the first pipe with a conduit of the second pipe in the welding joint portion; wherein
   the second forming step has a step of making the closed parts of the second extruded tubular member from part of the outer wall of the first extruded tubular member, while blowing a compressed gas into the first extruded tubular member to expand the first extruded tubular member.

4. A method of manufacturing a branching pipe comprising:
   extruding a first tubular member and a second tubular member substantially parallel to the first tubular member;
   arranging molds on both sides of the first extruded tubular member and the second extruded tubular member;
   molding the first extruded tubular member and the second extruded tubular member corresponding to molding surfaces of the molds by
      clamping the first extruded tubular member and the second extruded tubular member in respective cavities of the molds,
      blowing a compressed gas into the first extruded tubular member and the second extruded tubular member and
      closing parts of the second extruded tubular member by stopping the blowing of the compressed gas therein while continuing the blowing of the compressed gas into the first extruded tubular member to expand the first extruded tubular member and to thereby form a welding joint portion; and
   forming a connection hole in the welding joint portion for connecting a conduit of the first extruded tubular member with a conduit of the second extruded tubular member.

* * * * *